United States Patent [19]

Beshay

[11] Patent Number: 5,021,093

[45] Date of Patent: Jun. 4, 1991

[54] CEMENT/GYPSUM COMPOSITES BASED CELLULOSE-I

[76] Inventor: Alphons D. Beshay, 3595 de Courval, Trois-Riviéres, Quebec, Canada, G8Z 1S8

[21] Appl. No.: 204,272

[22] Filed: Jun. 9, 1988

Related U.S. Application Data

[63] Continuation-in-part of Ser. No. 95,119, Sep. 11, 1987, Pat. No. 4,820,749, which is a continuation-in-part of Ser. No. 739,169, May 29, 1985, Pat. No. 4,717,742.

[51] Int. Cl.$^5$ .............................. C04B 7/02; C08K 9/06
[52] U.S. Cl. ..................................... 106/731; 106/609; 106/618; 106/619; 106/638; 106/653; 106/713; 106/714; 106/715; 106/716; 106/780; 523/203; 523/212; 523/213; 523/214; 524/4; 524/5; 524/13; 524/35; 524/47; 524/52; 524/577; 524/583

[58] Field of Search .................. 106/93, 97–99, 106/103, 601, 606, 607, 609, 618–619, 713–716, 720, 624, 625, 638, 780, 731, 653; 524/4–5, 13, 35, 47, 52, 577, 583, 588; 527/312; 523/203, 212, 213, 214

[56] References Cited

U.S. PATENT DOCUMENTS

| | | | |
|---|---|---|---|
| 4,151,327 | 4/1979 | Lawton | 428/447 |
| 4,306,911 | 12/1981 | Gordon et al. | 106/731 |
| 4,406,703 | 9/1983 | Guthrie et al. | 106/731 |
| 4,486,501 | 12/1984 | Holbek | 428/375 |
| 4,710,540 | 12/1987 | McAlpin et al. | 524/3 |
| 4,773,934 | 9/1988 | Colin | 106/716 |
| 4,820,749 | 4/1989 | Beshay | 523/203 |
| 4,840,672 | 6/1989 | Baes | 106/716 |

Primary Examiner—Herbert J. Lilling

[57] ABSTRACT

Composite materials based on cement or gypsum materials reinforced by mixing with cellulosic fibers grafted with silylating agents. Processes for preparing these reinforced composites are also disclosed.

8 Claims, No Drawings

CEMENT/GYPSUM COMPOSITES BASED CELLULOSE-I

RELATED U.S. APPLICATIONS

This application is a continuation-in-part of Ser. No. 07/095,119, filed on 09/11/87, now U.S. Pat. No. 4,820,749 which is a continuation-in-part of Ser. No. 06/739,169, filed 05/29/85, now U.S. Pat. No. 4,717,742.

This invention relates to reinforced cement composites. More specifically, this invention relates to one of the useful applications of grafted cellulosic materials with silylating agents. The grafted cellulosic materials with silylating agents are basically prepared according to Beshay's U.S. Pat. Nos. 4,717,742, 4,820,749 and his CA No. 1,252,586.

Various methods had previously been employed at the past decade to reinforce cement or gypsum by using untreated cellulosic fibers in different forms such as wood chips, wood fibers, wood pulps, grinded paper wastes . . . etc. Other methods had been applied by treating the cellulosic fibers with coupling agents, mainly silane.

The term "treatment" means impregnation, or comprehended by the formation of secondary bonding at the cellulosic-silane interface.

Not only the cellulosic fibers/cement/water weight ratios or the coupling agents' quantities and/or qualities affect on the resultant mechanical properties of cement composites, but also the bonding type at the interfaces of the coupling agents and the cellulosic fibers.

The term "silane grafted cellulosic fibers" means the formation of a primary chemical bonding at the cellulose-silane interface by the effect of a specific catalyst. The present invention provides grafting of a silylating agent onto the cellulosic material. The grafting process onto cellulosic fibers can be carried out completely before mixing with cement or gypsum, or partially carried out and continued during or after mixing by the effect of internal rising temperature. The grafting process is carried out by generating free radicals according to Beshay's U.S. Pat. Nos. 4,717,742 and 4,820,749. The means of generating free radicals is preferably accomplished by using a free radical catalyst such as a peroxide (for example, t-butyl perbenzoate, dicumyl peroxide, methylethylketone peroxide, benzoyl peroxide, di-t-butyl peroxide, and 2,5-dimethyl-2,5-di-(t-butyl peroxide) hexane. A more detailed compilation of free radical initiators which may be used is set forth at pages 11-3, to 11-51 of "Polymer Handbook", Interscience Publishers (1966). Also the grafting process can be carried out by the effect of gamma radiation, U.V. radiation or any other effective process, for grafting the silylating agent.

An object of the present invention is to provide composite materials of cement or gypsum, or a mixture thereof, reinforced with silane grafted cellulosic fibers.

Another object provided according to this invention is the several advantages of the resultant composite materials. In addition to the better physiomechanical properties, is the lower in density and the durability, as well as the low costs . . . etc.

Among the useful applications of the present invention are for the purposes of manufacturing building materials, such as boards, panels, bricks, blocks . . . etc., which may be plain or colored, slurry, tubes, decks . . . etc.

This invention shows useful applications for chemical thermomechanical wood pulp derived from aspen and birch and semichemical pulp of bagasse. The grafting silylating agent is gamma aminopropyltriethoxysilane, hydrolized before the grafting process by the effect of an acidic or aqueous solution to decrease the silane quantity and to form a monolayer onto the cellulose surface. The selected grafting initiating catalyst is benzoyl peroxide and the selected cement is an ordinary Portland cement; the selected gypsum is also an ordinary gypsum. Wood fibers may be soaked in a calcium chloride solution before or after the grafting process to minimize the cement poisoning.

The results of this invention can be optimized by adjusting and selecting the methods and/or conditions of preparations. The quantitative and qualitative variations of silane, cellulosic fibers and silane grafting loads can also affect on the optimization of the results.

However, this invention is not limited to such materials, kinds of cement or gypsum, nor to their weight ratios. It also shows advantages when using other kinds of silane grafted onto other kinds of cellulosic fibers. The cellulosic fibers could be bamboo, wood flours, chips or fibers, cotton fibers or flakes, other pulps, stem or vegetable fibers, waste papers, cartons, cellulosic cloths. Said cellulosic fibers may be mixed with any kind or any weight ratio of inorganic fillers selected from the group of inorganic material of hydroxyl containing, clay, asbestos, sand, wollastonite, quartz, glass, mica, diatomaceuous earth, silica, talc, kaolinite, hydrated or partially hydrated metal oxides, metal powders, metal compounds, carbon, graphite and ashes.

The cellulosic fibers and inorganic fillers coul be synthetic or natural occurring material and if naturally occurring they could be used in either purified or unpurified form.

The grafting silylating agent according to this invention is gamma-aminopropyltriethoxysilane. However, this invention is not limited to such silane, nor to its weight ratio. It may advantageously be replaced by other kinds or other weight ratios of silylating agents, for example, gamma-methacryloxypropyltrimethoxysilane, propyltriethoxysilane, vinyltriethoxsilane, vinyltri(2-methoxyethoxy)silane, beta-(3,4-epoxycyclohexyl)-ethyltrimethoxysilane, gamma-glycidoxypropyltrimethoxysilane, gamma-mercaptopropyltrimethoxysilane, gamma-aminopropyltriethoxysilane, n-beta-(aminoethyl), gamma-aminopropyltrimethoxysilane, n-beta-(aminoethoxyl)-gamma-aminopropyltrimethoxysilane and gamma-chloropropyltrimethoxysilane or any other silylating agent having the general formula

or an oligomer thereof, wherein $R_1$, $R_2$ and $R_3$ are the same or different and are selected from the group comprising alkoxy with 1 to 6 carbon atoms, alkyl, alkenyl, cycloalkyl with 1 to 6 carbon atoms, aryl, aralkyl and organo-functional radicals.

EXAMPLES

This invention will now be furtherly described by non-limited examples.

EXAMPLE 1

2.5 parts (w/w) air dry chemicalthermomechanical wood pulp of aspen are mixed with 40 parts (w/w) ordinary portland cement and the balance water is 16 parts (w/w). The paste is mixed well by mechanical mixer for 5 minutes and placed into (dog-bone)-shaped molds (according to the ASTM standard C 109) for tensile testing, and in cubic shaped molds of 8 cubic inches volume (according to the ASTM standard c 190) for compression testing. The specimens are kept in the molds for 24 hours in closed plastic containers, then removed from the molds, soaked in water for further 24 hours, then stored for six days in closed plastic bags. After storage, specimens are unpacked and exposed to open air at room temperature until testing.

EXAMPLE 2

Same process as per example 1, but substituting the chemicalthermomechanical pulp of aspen with chemicalthermomechanical pulp of aspen pregrafted with gamma-aminopropyltriethoxysilane. The silane grafting load is 0.02%, which has previously been hydrolized with dilute hydrochloric acid (pH~3). The initiating agent is 0.5% benzoyl peroxide in acetone.

EXAMPLE 3

The procedure and tests here are followed as in example 2, but the ratios of silane grafted pulp, cement and water are 5, 40, and 17.6 respectively.

EXAMPLE 4

The procedure followed here as per example No. 2, but changing the ratios of silane grafted pulp, cement and water to 7.5, 40, 18.4 respectively.

EXAMPLE 5

Same process as per example No. 3, but the chemicalthermomechanical aspen pulp is soaked in 1% calcium chloride solution for about one hour before its being grafted with the same silane coupling agent.

EXAMPLE 6

In this example, the procedure as per example No. 5, but the soaking in calcium chloride solution is carried out after grafting the pulp with silane.

EXAMPLE 7

Same process as per example No. 2, but substituting the silane grafted chemicalthermomechanical pulp of aspen with semichemical pulp of bagasse.

EXAMPLE 8

Same process as per example No. 2, but mixing the silane grafted chemicalthermomechanical pulp of aspen with asbestos in a ratio 4:1 (w/w).

EXAMPLE 9

As per example No. 1, but substituting cement with gypsum.

EXAMPLE 10

As per example No. 2, but substituting cement with gypsum.

| | TABLE OF THE RESULTS | | |
|---|---|---|---|
| Example No. | Density | Tensile Strength MPa* | Compression Strength MPa* |
| 2 | 1.73 | 200% | 50% |
| 3 | 1.65 | 455% | 300% |
| 4 | 1.55 | 400% | 280% |
| 5 | 1.65 | 463% | 291% |
| 6 | 1.65 | 445% | 285% |
| 7 | 1.65 | 448% | 273% |
| 8 | 1.70 | 274% | 118% |
| 10 | 1.40** | 250%** | 170%** |

*The results are related to those realized in example no. 1, and by changing the pulp/cement/water ratios as per each example.
**The results are related to those realized in example no. 9.

I claim:

1. A composite material comprising a cement material, cellulosic fibers and optionally water, wherein said cellulosic fibers are (essentially) pregrafted with a silylating agent by generating a free radical process.

2. The composite material of claim 1, wherein the silane grafted cellulosic material is selected from the group consisting of chemicalthermomechanical wood pulp derived from aspen and semichemical pulp of bagasse.

3. The composite material of claim 1, wherein the silylating agent is selected from the group consisting of gamma-aminopropyltriethoxysilane, gamma-methacryloxypropyltrimethoxysilane, propyltriethoxysilane, vinyltriethoxysilane, vinyltri(2-methoxyethoxy)silane, beta-(3,4-epoxycyclohexyl)-ethyltrimethoxysilane, gamma-glycidoxypropyltrimethoxysilane, gamma-mercaptopropyltrimethoxysilane, gamma-aminopropyltrimethoxysilane, n-beta-(aminoethyl)-gamma-aminopropyltrimethoxysilane, n-beta-(aminoethoxyl)-gamma-aminopropyltrimethoxysilane and gamma-chloropropyltrimethoxysilane or any other silylating agent having the general formula

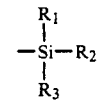

or an oligomer thereof, wherein $R_1$, $R_2$ and $R_3$ are the same or different and are selected from the group comprising alkoxy with 1 to 6 carbon atoms, alkyl, alkenyl, cycloalkyl with 1 to 6 carbon atoms, aryl, aralkyl and organo-functional radicals.

4. The composite material of claim 1 is additionally comprising inorganic filler material.

5. The composite material of claim 1, wherein the inorganic filler is selected from the group consisting of inorganic material of hydroxyl containing, clay, asbestos, sand, wollastonite, quartz, glass, mica, diatomaceous earth, silica, talc, kaolinite, hydrated or partially hydrated metal oxides, metal powders, metal compounds, carbon, graphite and ashes.

6. The composite material of claim 1, wherein the cement material is substituted with gypsum or a mixture thereof.

7. The composite material of claim 1, wherein the cellulosic fibers are treated with a salt solution before or after the silane grafting process.

8. The composite material of claim 7, wherein the salt solution is calcium chloride.

* * * * *